US008498888B1

(12) United States Patent
Raff et al.

(10) Patent No.: US 8,498,888 B1
(45) Date of Patent: Jul. 30, 2013

(54) COST-BASED FULFILLMENT TIE-BREAKING

(75) Inventors: Paul Raff, Redmond, WA (US); Xiao Yu Li, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 13/166,322

(22) Filed: Jun. 22, 2011

(51) Int. Cl.
*G06Q 10/00* (2012.01)

(52) U.S. Cl.
USPC ....... 705/7.12; 705/7.22; 705/7.25; 705/7.26; 705/7.27; 705/7.28; 705/7.31; 705/7.34; 705/7.36; 705/7.37; 705/22; 705/26.2; 705/26.9; 705/28; 705/7.21

(58) Field of Classification Search
USPC .................. 705/26.2, 7.12, 28, 22, 401, 330, 705/332
See application file for complete search history.

(56) References Cited

U.S. PATENT DOCUMENTS

| 5,631,827 | A | 5/1997 | Nicholls et al. |
| 5,897,629 | A | 4/1999 | Shinagawa et al. |
| 6,269,339 | B1* | 7/2001 | Silver ................................ 705/2 |
| 6,415,195 | B1 | 7/2002 | Gleditsch et al. |
| 6,415,196 | B1 | 7/2002 | Crampton et al. |
| 6,587,827 | B1 | 7/2003 | Hennig et al. |
| 7,058,587 | B1 | 6/2006 | Horne |
| 7,295,990 | B1* | 11/2007 | Braumoeller et al. ....... 705/7.31 |
| 7,747,543 | B1 | 6/2010 | Braumoeller et al. |
| 8,000,988 | B1* | 8/2011 | Bezanson et al. ............ 705/7.11 |
| 8,032,417 | B2* | 10/2011 | Marella et al. .................. 705/22 |
| 2002/0016759 | A1 | 2/2002 | Macready et al. |
| 2002/0026347 | A1 | 2/2002 | Yanagino et al. |
| 2002/0082954 | A1 | 6/2002 | Dunston |
| 2002/0095307 | A1 | 7/2002 | Greamo et al. |
| 2002/0133387 | A1 | 9/2002 | Wilson et al. |
| 2002/0138358 | A1 | 9/2002 | Scheer |
| 2002/0156663 | A1 | 10/2002 | Weber et al. |
| 2002/0169657 | A1 | 11/2002 | Singh et al. |

(Continued)

FOREIGN PATENT DOCUMENTS

| WO | WO0068859 | 11/2000 |
| WO | WO0108071 | 2/2001 |

OTHER PUBLICATIONS

Author—Yousef Amer; Title—Case Study: Optimizing Order Fulfillment in a Global Retail Supply Chain; Published—Aug. 27, 2009.*

(Continued)

*Primary Examiner* — Jason Dunham
*Assistant Examiner* — Deirdre Hatcher
(74) *Attorney, Agent, or Firm* — Robert C. Kowert; Meyertons, Hood, Kivlin, Kowert & Goetzel, P.C.

(57) ABSTRACT

Systems and methods for cost-based fulfillment tie breaking are disclosed. In some embodiments, a method may include receiving an indication of an order for an item stocked in a plurality of fulfillment centers, where a difference between a cost of fulfilling the order with one of the plurality of fulfillment centers and a cost of fulfilling the order with another one of the plurality of fulfillment centers is within a specified amount. The method may also include selecting a given one of the plurality of fulfillment centers to fulfill the order based, at least in part, upon expected costs corresponding to inventory positions that would result from fulfilling the order with each of the plurality of fulfillment centers.

20 Claims, 6 Drawing Sheets

U.S. PATENT DOCUMENTS

| | | | |
|---|---|---|---|
| 2002/0188499 | A1 | 12/2002 | Jenkins et al. |
| 2003/0033179 | A1 | 2/2003 | Katz et al. |
| 2003/0033180 | A1 | 2/2003 | Shekar et al. |
| 2003/0093388 | A1* | 5/2003 | Albright .................. 705/400 |
| 2005/0197892 | A1 | 9/2005 | Bilibin et al. |
| 2006/0136237 | A1* | 6/2006 | Spiegel et al. ................ 705/1 |
| 2007/0073552 | A1 | 3/2007 | Hileman |
| 2007/0226052 | A1* | 9/2007 | Abbott ......................... 705/14 |
| 2008/0086392 | A1* | 4/2008 | Bishop et al. ................. 705/28 |
| 2009/0222312 | A1* | 9/2009 | Degbotse et al. .............. 705/8 |
| 2009/0240544 | A1 | 9/2009 | Cheng et al. |
| 2010/0088136 | A1 | 4/2010 | Cheng et al. |

OTHER PUBLICATIONS

Glossary of Operation Research for Competitive Advantage: Keywords : "Inventory Position" as retreived from the Wayback Machine May 2010.*

U.S. Appl. No. 13/533,347, filed Jun. 26, 2012, Paul Raff, et al.

U.S. Appl. No. 12/981,370, filed Dec. 29, 2010, Pawel M. Cholewinski, et al.

U.S. Appl. No. 60/243,400, filed Oct. 2000, Keller et al.

"SAS/OR software" (7 pages) from www.archive.com, 1998.

SAS OnlineDoc version 8, (29 pages), www.v8doc.sas.com, 1999.

"Supply Chain Optimization: A methodology for strategic and tactical planning" by Cohen et al, SAS Institute white paper, Jan. 1999, 14 pages.

"Distributed supply chain simulation across enterprise boundaries" by Gan et al, Proceedings of the 2000 Winter Simulation Conference, 2000.

"Technology for supporting supply chain management: Introduction" by Kumar, Communications of the ACM, Jun. 2001, 5 pages.

"How i2 integrates simulation in supply chain optimization" by Padmos et al, Proceedings of the 1999 Winter Simulation Conference, 1999, 6 pages.

"Supply chain design and analysis models and methods" by Beamon, International Journal of Production Economics, Apr. 15, 1998, 14 pages.

"A Dynamic model for requirements planning with application to supply chain optimization" by Graves et al, Operations Research, May-Jun. 1998, 15 pages.

"Decision Making Through Operations Research", by Thierauf et al, John Wiley & Sons Publishing, 1975, 70 pages.

"Simulation modeling and optimization using Promodel" by Heflin et al, Proceedings of the 1998 Winter Simulation Conference, 1998, 7 pages.

"Simulation Modeling and optimization using Promodel" by Benson, Proceedings of the 1997 Winter Simulation Conference, 1997, 7 pages.

Promodel Resource Central, 2 pages from webarchive.com, 1998, 2 pages.

"Combined Discrete-continuous simulation models in Promodel for Windows" by Klingener, Proceedings of the 1995 Winter Simulation Conference, 1995, 9 pages.

"Using Simulation Optimization to find the best solution" by Akbay, IIE Solutions, May 1996, 6 pages.

"Linear Programming applied to a production blending problem: a spreadsheet modeling approach", Al-Shammari, PhD, et al. 1997, Production and Inventor Management Journal.

Amazon.com, Inc, Form 10-K/A for Fiscal Year 1999, 40 pages.

"Introduction to ProcessModel and ProcessModel 9000" by Gladwin et al, Proceedings of the 1997 Winter Simulation Conference, 1997, 7 pages.

"Using Simulation to Schedule Manufacturing Resources" by Czarnecki et al, Proceedings of the 1997 Winter Simulation Conference, 1997, 8 pages.

"Cost Accounting" by Horngren et al, Prentice Hall Publishers, 2000, 37 pages.

"Simulation Optimization Using Soft Computing" by Medaglia, Dissertation for Doctor of Philosophy at North Carolina State University, 2000, 144 pages.

"Decision support with web-enabled software" by Cohen et al, vol. 31, Iss. 2, Interfaces, Mar.-Apr. 2001, 14 pages.

* cited by examiner

Table of Inventory Positions

| Units at Fulfillment Center 2 (FC2) | | | cost (8, 2) | cost (7, 3) | | | | | | | |
|---|---|---|---|---|---|---|---|---|---|---|---|
| 10 | 2.000 | 1.307 | 0.813 | 0.519 | 0.370 | 0.304 | 0.278 | 0.269 | 0.267 | 0.267 | 0.267 |
| 9  | 1.800 | 1.134 | 0.690 | 0.446 | 0.332 | 0.287 | 0.272 | 0.267 | 0.266 | 0.266 | 0.267 |
| 8  | 1.600 | 0.968 | (0.579) | 0.385 | 0.304 | 0.276 | 0.268 | 0.266 | 0.266 | 0.266 | 0.267 |
| 7  | 1.400 | 0.810 | 0.482 | (0.336) | 0.284 | 0.269 | 0.266 | 0.266 | 0.266 | 0.267 | 0.269 |
| 6  | 1.200 | 0.662 | 0.400 | 0.300 | 0.271 | 0.265 | 0.265 | 0.266 | 0.268 | 0.272 | 0.278 |
| 5  | 1.000 | 0.528 | 0.334 | 0.275 | 0.264 | 0.264 | 0.265 | 0.269 | 0.276 | 0.287 | 0.304 |
| 4  | 0.800 | 0.410 | 0.285 | 0.261 | 0.261 | 0.264 | 0.271 | 0.284 | 0.304 | 0.332 | 0.370 |
| 3  | 0.600 | 0.312 | 0.254 | 0.254 | 0.261 | 0.275 | 0.300 | 0.336 | 0.385 | 0.446 | 0.519 |
| 2  | 0.400 | 0.240 | 0.240 | 0.254 | 0.285 | 0.334 | 0.400 | 0.482 | 0.579 | 0.690 | 0.813 |
| 1  | 0.200 | 0.200 | 0.240 | 0.312 | 0.410 | 0.528 | 0.662 | 0.810 | 0.968 | 1.134 | 1.307 |
| 0  | 0.000 | 0.200 | 0.400 | 0.600 | 0.800 | 1.000 | 1.200 | 1.400 | 1.600 | 1.800 | 2.000 |
|    | 0 | 1 | 2 | 3 | 4 | 5 | 6 | 7 | 8 | 9 | 10 |

Units at Fulfillment Center 1 (FC1)

COST-BASED FULFILLMENT TIE-BREAKING

BACKGROUND

To offer customers a wide variety of products that are readily available for delivery, a merchant (whether engaging in electronic or conventional "brick and mortar" commerce) may store those products in warehouses, fulfillment centers, or other inventory facilities. Keeping a product in inventory may serve to attenuate variations in customer demand and/or in a manufacturer or distributor's ability to supply that product. For example, in some cases, different products offered for sale by a merchant may have different manufacturer lead times, and holding certain quantities of those products "in stock" may enable a merchant to make such products available to customers in a more consistent fashion.

When a merchant operates more than one fulfillment center, an incoming order may require that one of its fulfillment centers be selected to fulfill that order. Using the so-called "greedy approach," for instance, each order may be fulfilled by the fulfillment center that is geographically closest to the delivery address specified by the customer. This approach follows the general idea that it would be more expensive to ship the item to a given address from a fulfillment center that is more distant from that address. Similarly, other techniques used in selecting fulfillment centers may aim to minimize shipping costs for existing, outstanding orders.

There are certain situations, however, where an incoming order may specify a delivery address to which the costs of shipping an item from different fulfillment centers are approximately (or perhaps exactly) the same. In instances where there is no clear "winner" among two or more fulfillment centers, the merchant may, for example, randomly select any of those fulfillment centers to fulfill the order.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Introduction

Various embodiments of systems and methods for cost-based fulfillment tie-breaking are disclosed. In some embodiments, a merchant may operate a plurality of fulfillment centers that carry a particular item in stock. The merchant may receive an order for that item that specifies one or more delivery parameters (e.g., a delivery address, a shipping option, or a combination thereof) such that, for two or more of the merchant's fulfillment centers, fulfillment costs are approximately the same and/or within a threshold value of each other. Rather than arbitrarily selecting a particular fulfillment center to fulfill the received order, techniques described herein may allow the merchant to make fulfillment assignments based, at least in part, on the impact that different inventory positions—resulting from different fulfillment scenarios for the present order—would have on future orders.

In some embodiments, a method may include receiving an order for an item stored in two or more fulfillment centers, where the order specifies a shipping destination such that a cost of fulfilling the order with a first of the two or more fulfillment centers is within a threshold value of a cost of fulfilling the order with a second of the two or more fulfillment centers. The method may also include determining a first expected cost corresponding to an inventory position of the item within the two or more fulfillment centers that would result from fulfilling the order with the first of the two or more fulfillment centers and determining a second expected cost corresponding to an inventory position of the item within the two or more fulfillment centers that would result from fulfilling the order with the second of the two or more fulfillment centers. In response to the first expected cost being less than the second expected cost, the method may further include selecting the first of the two or more fulfillment centers to fulfill the order and causing the order to be fulfilled by the first of the two or more of fulfillment centers.

In other embodiments, a system may include at least one processor and a memory coupled to the at least one processor, where the memory stores program instructions, and where the program instructions are executable by the at least one processor to cause the system to receive an order for an item stored in a plurality of fulfillment centers. For example, the received order may specify a delivery parameter for which fulfillment costs of different ones of the plurality of fulfillment centers are within a threshold of each other. The program instructions may be further executable by the at least one processor to determine expected costs of fulfilling a future order for the item based at least in part on simulated fulfillment of the received order by different ones of the plurality of fulfillment centers, and select a given one of the plurality of fulfillment centers to fulfill the received order based, at least in part, upon the expected costs.

In yet other embodiments, a tangible computer-readable storage medium has program instructions stored thereon that, upon execution by a computer system, may cause the computer system to receive an indication of an order for an item stocked in a plurality of fulfillment centers, where a difference between a cost of fulfilling the order with one of the plurality of fulfillment centers and a cost of fulfilling the order with another one of the plurality of fulfillment centers is within a specified amount. The program instructions, upon execution by the computer system, may also cause the computer system to select a given one of the plurality of fulfillment centers to fulfill the order based, at least in part, upon expected costs corresponding to inventory positions that would result from fulfilling the order with each of the plurality of fulfillment centers.

As used herein, the term "merchant" includes any entity capable of conducting and/or fulfilling a sales transaction in response to an actual or expected order or request. Typically, a merchant may present or offer various products or items to its customers, as well as information about those items (e.g., availability and pricing information, product details, images, etc.) that facilitate a sale. For example, a retail enterprise that generally sells merchandise to end consumers (e.g., not generally intended for resale as new) may sell through an online, web-based channel that may include an online catalog or portal configured to display information about items or products, a web-based order entry system such as a virtual shopping cart or other system, a status tracking tool through which customers may track the status or progress of orders, a search engine, and any of a number of other features suitable for promoting and performing sales transactions. Merchants may also engage in transactions using other types of sales channels. For example, a merchant may employ a mail-order catalog channel, where customers may receive information about items or products via a mailed catalog and make orders using paper forms and/or via telephone. Additionally or alternatively, a merchant may have a physical (i.e., "brick-and-mortar") store, through which customers may receive information about products and order or purchase those products in person.

As used herein, the term "customer" includes any purchaser (or potential purchaser) of an item or product, including entities other than an end consumer of a product sold. Therefore, manufacturers, distributors, retailers, and consumers may be "merchants" and/or "customers" depending upon their position within the supply chain. It is noted that in some embodiments, a unit of an item may be rented, leased or licensed to a customer under specific terms in exchange for revenue or other economic consideration.

As used herein, the term "sale" includes any suitable transaction involving an item resulting in either direct or indirect (e.g., imputed or tangential) revenue, and is intended to encompass rentals, leases, subscriptions, licenses, and other types of revenue models.

As used herein, the term "fulfillment center" includes any inventory storage facility including, for example, warehouses, repositories, depositories, stockrooms, storehouses, distribution centers, material handling facilities, or the like.

Fulfillment Systems

Figure 1:
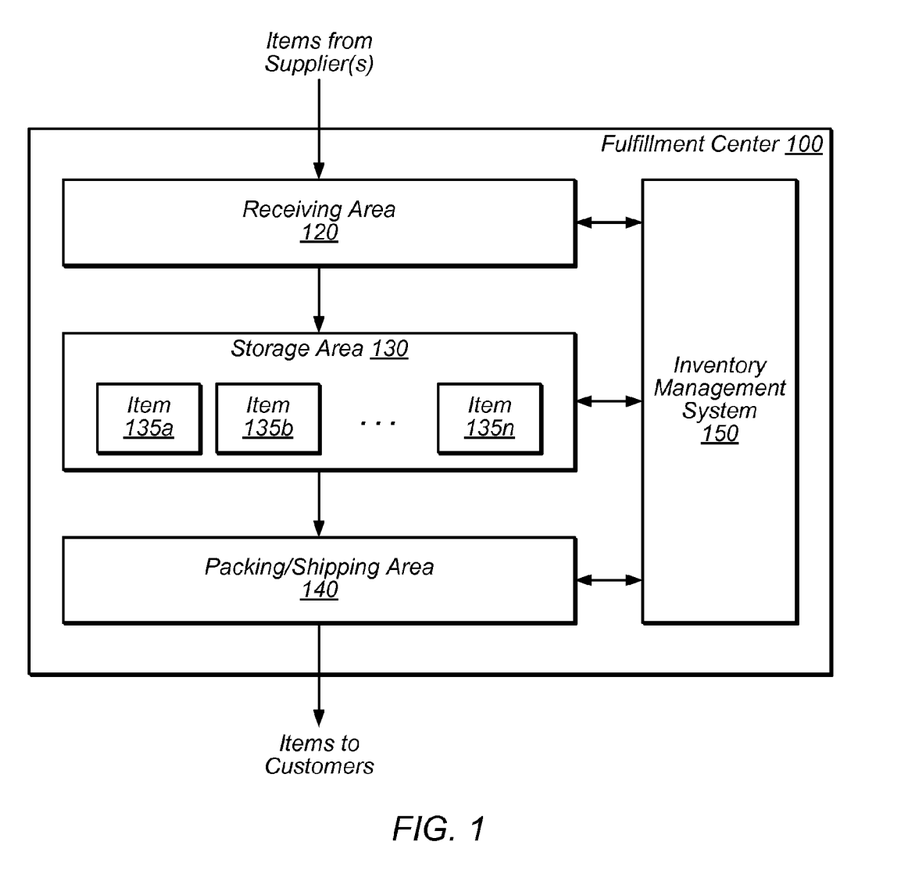
FIG. 1 is a block diagram of a fulfillment center according to some embodiments.

In order to offer a wide variety of items that are readily available for delivery, a merchant may store various quantities of such items within one or more geographically distributed fulfillment centers. An embodiment of one such fulfillment center is shown in FIG. 1 by way of a non-limiting example. As illustrated, fulfillment center 100 includes receiving area 120, storage area 130 configured to store an arbitrary number of items or products 135a-n, and packing/shipping area 140. The arrangement of the various areas within the illustrated embodiment of fulfillment center 100 is depicted functionally rather than schematically. For example, in some embodiments, it is noted that multiple different receiving areas 120, storage areas 130, and packing/shipping areas 140 may be interspersed rather than segregated. Additionally, fulfillment center 100 includes an inventory management system 150 configured to interact with each of receiving area 120, storage area 130 and packing/shipping area 140.

Fulfillment center 100 may be configured to receive different kinds of items 135 from various suppliers and to store them until a customer order specifying particular ones of items 135 is received. The particular items 135 may then be selected from storage and sent to the customer. The general flow of items through fulfillment center 100 is indicated using arrows. Specifically, in the illustrated embodiment, items 135 may be received from one or more suppliers, such as manufacturers, distributors, wholesalers, etc. at receiving area 120. In various embodiments, items 135 may include merchandise, commodities, perishables, or any suitable type of item depending on the nature of the merchant or enterprise that operates fulfillment center 100. Upon being received from a supplier at receiving area 120, items 135 may be prepared for storage. For example, in some embodiments items 135 may be unpacked or otherwise rearranged, and inventory management system 150 (which, as described below, may include one or more software applications executing on a computer system) may be updated to reflect the type, quantity, condition, cost or any other suitable parameters with respect to newly received items 135. It is noted that items 135 may be stocked, managed or dispensed in terms of countable, individual units or multiples of units, such as packages, cartons, crates, pallets or other suitable aggregations. Alternatively, some items 135 such as bulk products, commodities, etc. may be stored in continuous or arbitrarily divisible amounts that may not be inherently organized into countable units. Such items 135 may be managed in terms of measurable quantities such as units of length, area, volume, weight, time duration or other dimensional properties characterized by units of measurement. Generally speaking, a quantity of an item 135 may refer to either a countable number of individual or aggregate units of an item 135 or a measurable amount of an item 135, as appropriate.

After arriving through receiving area 120, items 135 may be stored within storage area 130. In some embodiments, like items 135 may be stored together in bins, on shelves or via other suitable storage mechanisms, such that all items 135 of a given kind are stored in one location. For example, items having a common Universal Product Code (UPC), Stock-Keeping Unit (SKU) code, or other designation (including proprietary designations) may be stored together. In other embodiments, like items 135 may be stored in different locations. For example, to optimize retrieval of certain items 135 having high turnover within a large physical facility, those items 135 may be stored in several different locations to reduce congestion that might occur at a single point of storage.

When a customer order specifying one or more of items 135 is received, the corresponding items 135 may be selected or "picked" from storage area 130. In various embodiments, item picking may range from minimally automated to completely automated picking. For example, in one embodiment fulfillment center employees may pick items 135 using written or electronic pick lists derived from customer orders, while in another embodiment conveyor belts and robotics may be used to pick and transfer items 135. After the items 135 corresponding to a particular order are picked, they may be processed at packing/shipping area 140 for shipment to the customer. For example, items may be packaged for shipment to the customer using a common carrier, or simply bagged or otherwise prepared for direct transfer to a customer, e.g., at an order pickup counter. In some embodiments, further interaction with inventory management system 150 may occur when items 135 are picked from storage area 130 and/or processed at packing/shipping area 140, for example to update inventory records to reflect the removal of inventory, to record revenue for the sale or other transaction (e.g., lease, rental, exchange, etc.) and so forth.

Management of items 135 stored as inventory within fulfillment center 100 often presents complex optimization problems. Generally speaking, the level of inventory of a given item 135 may affect the quality of service associated with providing the given item to a customer. Quality of service may encompass factors such as general availability and selection of items 135, timeliness of order completion, or any other factors relevant to a customer's perceived experience in conducting business relating to items 135. As an example of the interaction between inventory levels and quality of service, if a particular item 135 ordered by a customer is not in stock within fulfillment center 100, the customer may be forced to wait for delivery until that particular item 135 can be obtained, or the customer may cancel the order resulting in a lost sale. Consequently, keeping a number of units of items 135 on hand may assist in the timely fulfillment of orders and increase customer satisfaction. A larger inventory, for example, may more readily accommodate unexpected increases in customer demand.

On the other hand, various costs are typically associated with storing items 135 in fulfillment center 100 for any period of time. In some embodiments, holding a unit of an item 135 in storage within storage area 130 may incur incremental storage costs. For example, the cost of providing fulfillment center 100 in which items 135 may be stored may include recurring real estate costs (e.g., lease costs, debt service, etc.), personnel costs, facilities costs (e.g., utilities, maintenance, etc.) and any other costs associated with fulfillment center 100. In addition to storage costs, in some embodiments, holding a unit of an item 135 in storage may incur capital or economic costs related to the price paid to obtain the item. That is, once working capital or cash flow is committed to a unit of an item 135 (e.g., once that unit is paid for), that economic value is not available for other purposes; the committed value is "tied up" in the corresponding inventory. Other types of costs may also be associated with holding units of items 135 in storage. For example, in the ordinary course of operation of fulfillment center 100, items 135 may be subject to loss or damage due to accidents or mishaps. A rate of loss, or a corresponding rate of insurance against such loss, may be included within an overall cost of holding a unit of an item 135. Also, over time, items 135 may depreciate, expire, spoil or become obsolete, which may also be expressed as part of a cost of holding such items 135. At least in part to avoid or minimize some of these various costs, it is common practice for a merchant to fulfill existing orders for items 135 as soon as those orders are received and processed.

A merchant that deals with customers on a large scale may not adequately meet its business goals with only a single fulfillment center 100. For example, a merchant that deals in many different types of items 135 and/or that services customers in a large geographical region may find it impractical to keep its entire inventory in one facility. In some instances, a merchant that faces the challenge of scaling its inventory and fulfillment handling capabilities may choose to deploy a more complex fulfillment network. To address these challenges, the merchant may implement an order fulfillment and inventory planning system or the like.

Figure 2:
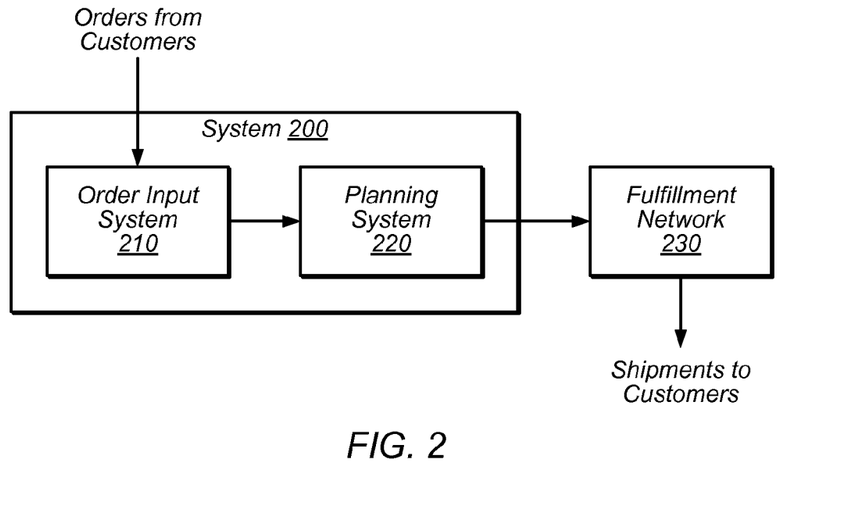
FIG. 2 is a block diagram illustrating one embodiment of a system configured to receive customer orders and perform fulfillment planning according to some embodiments.

FIG. 2 illustrates an embodiment of a system configured to receive customer orders and perform fulfillment and inventory planning according to some embodiments. Specifically, system 200 may be configured to receive customer orders for items 135, determine how customer orders should be assigned to the resources of network 230 for fulfillment, and dispatch instructions to the assigned resources of network 230 in order to effect shipment of customer orders. In the illustrated embodiment, system 200 includes an order input system 210 that is configured to communicate with a planning system 220, which is in turn configured to communicate with network 230.

Generally speaking, order input system 210 may be configured to receive orders placed by customers for various items 135 offered by the merchant. In some embodiments, order input system 210 may be configured to implement an electronic commerce (e-commerce) portal, such as a web-based interface through which customers may browse items 135, select items 135 for ordering, and supply details regarding orders (e.g., payment information, shipping address information, etc.). In other embodiments, order input system 210 may be configured to implement an order entry interface that is not presented to the customer directly, but which is instead employed by an agent (e.g., a salesperson, customer service representative, etc.) to input order information on behalf of a customer.

Planning system 220 may generally be configured to receive incoming orders received by the merchant via order input system 210 and to analyze customer orders to determine how they should be assigned to various fulfillment centers of network 230 for fulfillment. For example, if a given customer orders five distinct items 135, it may be possible to ship all of the ordered items 135 from a single fulfillment center 100. However, it may also be possible to divide the given customer's order for fulfillment by multiple different fulfillment centers 100. As discussed below, numerous different variables and constraints may be taken into account by planning system 220 when generating a fulfillment plan for an order, such as the costs associated with various plans, the promises made to the customer regarding shipping or arrival dates, or other factors.

After identifying the fulfillment plan that should be executed for a particular order, planning system 220 may be configured to communicate instructions to network 230 in order to realize the plan. For example, planning system 220 may interact with the inventory management system 150 of a fulfillment center 100 corresponding to a particular fulfillment center to instruct that certain items 135 of a particular order should be picked, packed, and shipped to the customer for the particular order. Alternatively, planning system 220 may interact with a drop shipper, such as a third party merchant or distributor, to instruct that certain items 135 of a particular order should be shipped to the customer. In various embodiments, communication of fulfillment instructions that are needed to implement a particular fulfillment plan to the various fulfillment centers 100 within network 230 may occur according to any suitable technique. For example, planning system 220 may be configured to exchange messages with systems within a particular fulfillment center using web-based protocols (e.g., Hypertext Transfer Protocol (HTTP), eXtensible Markup Language (XML), or other suitable protocols) conveyed via the public Internet, a private intranet, Virtual Private Networks, or another suitable networking scheme or combination of these. Communication between planning system 220 and fulfillment centers may also be implemented using electronic mail or other messaging techniques, analog or digital telephony, or any other wired or wireless data transfer technique, either using standard or proprietary protocols.

In various embodiments, order input system 210 and planning system 220 may be implemented as respective dedicated computer systems, or they may be implemented as computer-executable instructions and data that may be executed by one or more computer systems (e.g., as described in greater detail below with respect to FIG. 5). Systems 210 and 220 are discussed and shown as separate systems in order to facilitate their description; however, in some embodiments, the functions of these systems may be integrated into and implemented by a single computer system or set of computer-executable instructions. Alternatively, the functionality of systems 210 and 220 may be partitioned differently than is shown in FIG. 2. For example, some functions of these systems may be assigned to or subsumed within the operation of other systems.

Additionally, it is contemplated that order input system 210 and/or planning system 220 may interact with or implement various features of a number of other features not shown. For example, in one embodiment, order input system 210 may be configured to interact with accounting and billing systems in order to collect customer payments and update enterprise financial records to reflect the effects of transactions. In one embodiment, planning system 220 may be configured to interact with additional systems that track the current state of inventory within network 230 and/or predict its future state (e.g., by predicting lead time for various items 135, accounting for items 135 that are inbound to network 230 but not yet received by fulfillment centers, or analyzing or predicting other network state variables). Planning system 220 may also interact with other systems that model or estimate variables that may influence the planning process, such as the expected transit time for shipping from a particular fulfillment center to a customer via a particular carrier and/or shipping method.

Order and Fulfillment Processing

In a typical scenario, a customer may place one or more orders with a merchant for one or more units of one or more items. For simplicity of explanation, however, let us consider a situation where the customer places one order for one unit of one item. The order may be placed online (i.e., with a computer device connected to the Internet), via a mail-in form, via a telephone, in-person, or in any other suitable manner. In the case of an online order, that order may be received, for example, by order input system 210 shown in FIG. 2. The customer may select the item for purchase and add it to a virtual "shopping cart." During a "checkout" procedure, the customer may provide billing and/or shipping address information to the merchant, as well as specify other shipping or delivery options such as, for example, a shipping speed (e.g., same-day delivery, next-day delivery, two-day delivery, ground delivery, etc.), a carrier (e.g., USPS, UPS®, FedEx®, etc.), or the like.

As previously noted, the merchant may operate or otherwise have at its disposal a fulfillment network that includes a number of individual fulfillment centers distributed across a wide geographic area (e.g., North America, Europe, etc.). Hence, once the customer's order is received, the merchant may have an opportunity to make decisions as to how to fulfill the order (e.g., which of its fulfillment centers will the item ship from, etc.).

Figure 3:
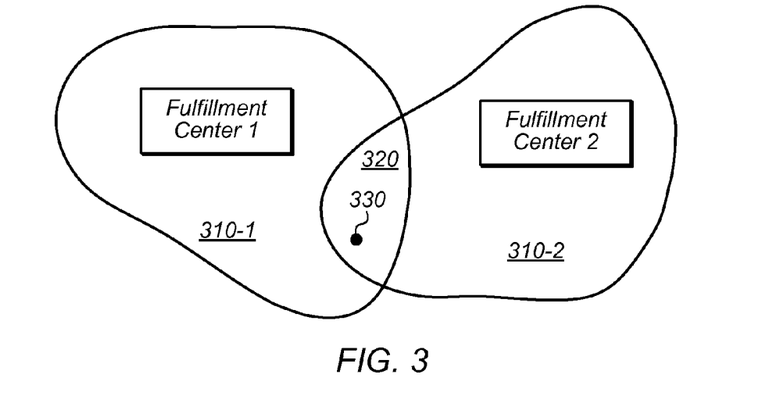
FIGS. 3-5 are diagrams illustrating different fulfillment scenarios according to some embodiments.

Turning now to FIG. 3, a diagram illustrating a particular fulfillment scenario is depicted according to some embodiments. In this case, the relevant portion of the fulfillment network includes two fulfillment centers, "FC1" and "FC2." (More generally, the fulfillment network may include several fulfillment centers.) Each of FC1 and FC2 may be capable of fulfilling an order that specifies a delivery addresses in regions 310-1 and 310-2 with different fulfillment costs. For example, assume that FC1 is able to ship an ordered item to region 310-1 with a first fulfillment cost. If FC2 were selected to ship the same item to region 310-1, its fulfillment costs would typically be higher than that first fulfillment cost because, as FIG. 3 indicates, FC2 is more distant from region 310-1 than FC1. Conversely, assume that FC2 is capable of shipping an ordered item to region 310-2 with a second fulfillment cost. If FC1 were selected to ship the same item to region 310-2, its fulfillment costs would typically be higher that the second fulfillment cost. Accordingly, when an order specifies a shipping address that falls within region 310-1, a merchant will ordinarily determine that the order be fulfilled by FC1. On the other hand, if an order specifies a shipping address in region 310-2, FC2 may be selected to fulfill that order. (Element 330 is discussed below with respect to FIG. 4.)

Still referring to FIG. 3, region 320 may represent an area for which the costs of fulfilling an order from FC1 or FC2 are approximately the same—i.e., there is a "tie" between FC1 and FC2. In some cases these costs may in fact be exactly the same—i.e., the difference between them is zero. In other cases, however, the costs may be such that a difference between them may fall within a selected threshold value or amount. In some embodiments, the selected threshold may represent a value such that, if the difference between fulfillment costs of two or more fulfillment centers shipping to a particular area fall within the threshold, those fulfillment centers are deemed to be tied. For instance, the threshold may be provided as a dollar amount (e.g., $0.05, $0.10, $0.25, etc.), as a ratio of fulfillment cost over another suitable parameter (e.g., sales price of the item, cost of holding the item in stock, etc.), or the like. As illustrated in FIG. 3, if an incoming order specifies a delivery address within region 320, the merchant's selection of which of FC1 or FC2 will fulfill the order may involve breaking the tie.

In various embodiments, regions 310-1, 310-2, and 320 may correspond to geographic regions (e.g., areas on a map). In other embodiments, the graphical representations of each of regions 310-1, 310-2, and 320 may correspond to different parameter spaces that would result in the same or similar fulfillment costs, and may not necessarily be directly mapped to geographical locations. For example, in some cases, similar-fulfillment-cost "regions" need not be geographically adjacent and/or contiguous with respect to each other (e.g., there may be one or more separate areas with same fulfillment costs associated with a single fulfillment center). Generally speaking, the granularity with which regions covered by a given fulfillment network are defined may depend on data available for making similar-fulfillment-cost determinations and/or on the level of precision desired by the merchant.

Figure 4:
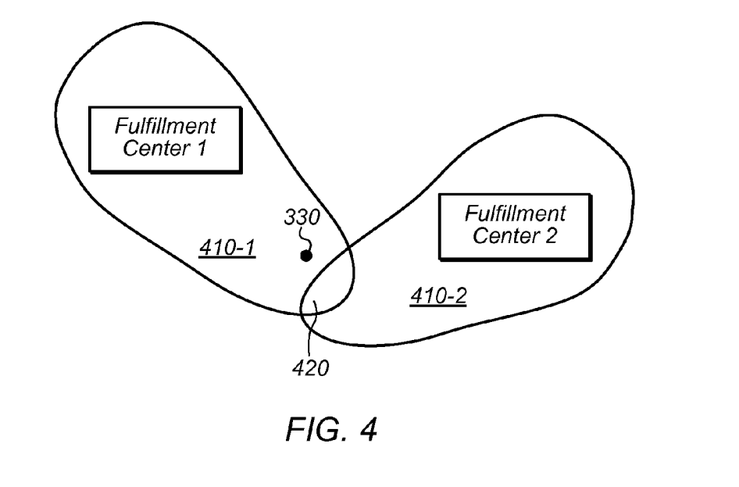

In some embodiments, a fulfillment cost may be a function of a shipping or delivery address. In the United States, for example, shipping rates are often directly proportional to shipping distance. Additionally or alternatively, a fulfillment cost may be a function of a shipping option, such as, for example, a shipping or delivery speed, a selected carrier, etc. specified by the customer during a "checkout" operation on a merchant's website, as described above. Furthermore, the size and/or shape of similar-fulfillment-cost regions may vary depending upon a selected shipping option, as illustrated in FIG. 4. This particular scenario is similar to that of FIG. 3, in that FC1 and FC2 are associated with their respective similar-fulfillment-cost regions 410-1 and 410-2. As shown, a cost difference between orders fulfilled by FC1 and FC2 to regions 410-1 and 410-2 may be greater than a threshold value, whereas region 420 indicates a region were these cost differences are smaller than the threshold. Accordingly, similarly as described above in FIG. 3, selection between FC1 and FC2 for orders falling within region 420 would involve breaking a tie.

It may be noted, however, that the areas of regions 410-1, 410-2, and 420 are different from those of corresponding regions 310-1, 310-2, and 320. As explained above, in some cases, similar-fulfillment-cost regions may be determined a function of variables other than (or in addition to) a delivery address. As a hypothetical example, assume that FIG. 3 represents a scenario where ground shipping is selected, whereas FIG. 4 shows an otherwise identical situation, but where two-day delivery is chosen. As illustrated, there would be a tie in FIG. 3 as between FC1 and FC2 if an order for an item to be shipped to point 330 (because point 330 is within region 320). However, there would not be a tie in FIG. 4 for an order for the same item to be shipped to the same point 330 (i.e., because point 330 is outside region 420). In other words, it would be generally cheaper to fulfill a two-day delivery order to point 330 from FC1 (in FIG. 4), while the same order specifying ground delivery may result in a tie (in FIG. 3) between FC1 and FC2.

In addition to the foregoing, the shape and/or size each similar-fulfillment cost region may be a function of the selected threshold values. In other words, a selected threshold value may determine whether two fulfillment centers available to fulfill a particular order are tied. Generally speaking, selection of a large threshold may increase overlap regions 320 or 420 in FIGS. 3 and 4, respectively. For example, if a merchant selects a $0.10 threshold value, a first fulfillment cost (e.g., for FC1) of $2.00 would be deemed a tie with respect to a second fulfillment cost (e.g., for FC2) of $1.91 because the difference between them would be smaller than the threshold—thus effectively increasing the area of overlap regions 320 and 420. Conversely, if a merchant selects a $0.08 threshold value, the same fulfillment costs would no longer be deemed a tie because the difference between them would be greater than the threshold—thus effectively reducing the area of overlap regions 320 and 420.

Figure 5:
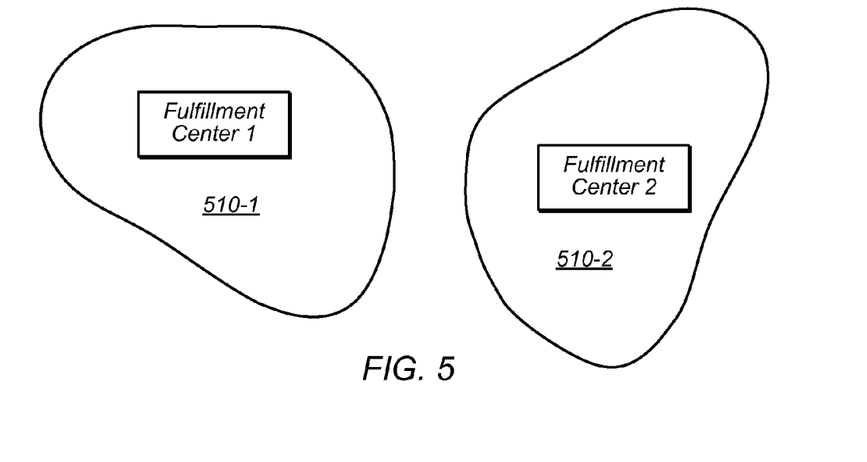

FIG. 5 illustrates a scenario where there does not appear to be a similar-fulfillment-cost region between FC1 and FC2. In other words, there is no intersection or overlap between regions 510-1 and 510-2. Although a merchant may still implement mechanisms to determine how to fulfill an incoming order by selecting between FC1 and FC2 in an optimal manner, those mechanisms would not generally involve breaking a tie.

Tie-Breaking Techniques

To better illustrate certain techniques described herein, consider the following scenario. Assume that there is one unit of an ordered item each in a first fulfillment center (e.g., FC1) and in a second fulfillment center (e.g., FC2). Also, it costs $1 to ship the item to zip code 11111 (e.g., regions 320 or 420 in FIGS. 3 and 4, respectively), regardless of whether it is shipped from FC1 or FC2. Shipping the item to zip code 22222, however, costs $1 from FC1 and $2 from FC2. If a first order for the item comes from zip code 11111, followed by a second order from zip code 22222, it would be desirable to prevent the first order from being fulfilled from FC1, thus causing an out-of-stock situation in FC1 and resulting in greater-than-optimal costs to fulfill the second order from FC2.

To address these concerns, in some embodiments systems and methods described herein may provide a mechanism for an order assignment engine (that may be implemented, for example, by planning system 220 of FIG. 2) to intelligently break the tie produced in the first order to ensure that the resulting inventory position is optimal for demand expected to materialize in the future. In some cases the techniques described below may assign a cost to a given inventory position for an item that represents greater-than-optimal costs expected to be incurred due to future orders as a result of the given inventory position. The order assignment engine may then use this information to break ties by trying to minimize (or at least reduce) future fulfillment costs—i.e., future expected costs that correspond to orders that have not yet materialized.

A model for calculating future fulfillment costs may be designed and implemented as follows. First, assume a situation that involves one ordered item and two competing fulfillment centers. Also, assume that $p_M$ is the demand probability for the item in areas where it is cheaper to fulfill from FC1 than from FC2, $p_O$ is the demand probability for the item in areas where it is cheaper to fulfill from FC2 than from FC1, $c_M$ is the additional cost(s) incurred to fulfill from FC2 to the area in which it would be cheaper to fulfill from FC1, and $c_O$ is the additional cost(s) incurred to fulfill from FC1 to the area in which would be cheaper to fulfill from FC2. It may also be assumed that $p_M+P_O<1$, $c_M>0$, and $c_O>0$. If $p_M+p_O<1$, then there are areas where there is no difference in cost to fulfill from FC1 than FC2.

We would like to calculate cost(a, b) for all possible values a and b, where a represents the inventory at FC1 and b represents the inventory at FC2. Assume that orders for this item comes sequentially and independently from the three areas (e.g., 310-1, 310-2 and 320 in FIG. 3 or 410-1, 410-2, and 420 in FIG. 4), represented by the probabilities $p_M$, $p_O$, and $1-p_M-p_O$, respectively. These assumptions yield the following base cases:

First, cost(0, 0)=0, because there is no penalty for not having any inventory. In alternative embodiments, however, a cost of being completely out of stock may be included here.

Second, cost(a, 0)=$c_O$($p_O$a), because when there are a units left, on average $p_O$a of the demand for these a units will come from the area where it is cheaper to fulfill from FC2 than FC1. However, since the only remaining inventory resides at FC1, the merchant would incur a penalty cost of $c_O$ for each of these units.

Third, cost(0, b)=$c_M$($p_M$ b). The reasoning is precisely the same as for cost(a, 0), with FC1 and FC2 reversed.

Generally, calculating expected costs represented by cost (a, b) may involve using known probabilities along with cost (a−1, b) and cost(a, b−1). When seeking to minimize these costs, in the $1-p_M-p_O$ probability that there is no difference in fulfilling from FC1 or FC2 (i.e., there is a tie in overlap regions 320 or 420), a merchant may choose to fulfill from FC1 if cost(a−1, b)<cost(a, b−1), and may choose to fulfill from FC2 otherwise, which leads to:

$$\text{cost}(a, b) = p_M \cdot \text{cost}(a-1, b) + p_O \cdot \text{cost}(a, b-1) + (1 - p_M - p_O) \cdot \min\left\{\begin{array}{l}\text{cost}(a-1, b)\\ \text{cost}(a, b-1)\end{array}\right| \quad \text{Equation (1)}$$

The first two terms of Equation (1) reflect the fact that, if it is cheaper to fulfill from a specific FC for this order, then the merchant may select to do so. Further, if all of the inputs are available, cost(a, b) may be determined with a recursive calculation that uses cost(a−1, b) and cost(a, b−1) to populate a look-up table of values starting at cost(0, 0)=0. In some embodiments, such a table may be stored in memory for quick retrieval of values. In other embodiments, the table may be calculated on-the-fly in response to receiving an order. An example of such a table using values $p_M=p_O=0.2$ and $c_M=c_O=1$ is shown in FIG. 6.

Figure 6:
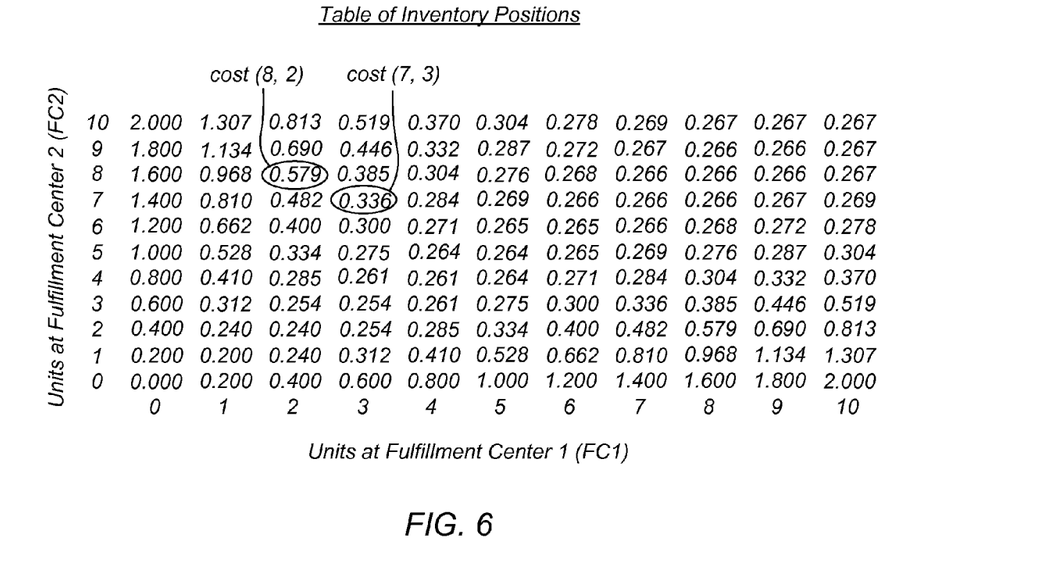
FIG. 6 is a table of fulfillment costs corresponding to various inventory positions according to some embodiments.

Particularly, FIG. 6 illustrates a table of inventory positions with values for cost(a, b) for $0 \leq a, b \leq 10$. Rows represent the inventory position in FC1, and columns represent the inventory position in FC2. For example, if a merchant currently has 8 units of inventory at FC1 and 3 units at FC2, then the current cost is cost(8, 3)=0.385. If an order is received for an item where there is no difference of fulfilling from FC1 or FC2 (or the difference is within a selected threshold), then the merchant has two options. First, the merchant may fulfill the received order from FC1, with a resulting expected cost of cost(7, 3)=0.336. Alternatively, the merchant may fulfill the receiver order from FC2, which would result in cost(8, 2)=0.579. In this case, because cost(7, 3)<cost(8, 2), the merchant may select to break the tie by fulfilling the received order from FC1. In other words, selection of FC1 to fulfill the present order would be expected to minimize the cost of the item's inventory position for future orders.

Figure 7:
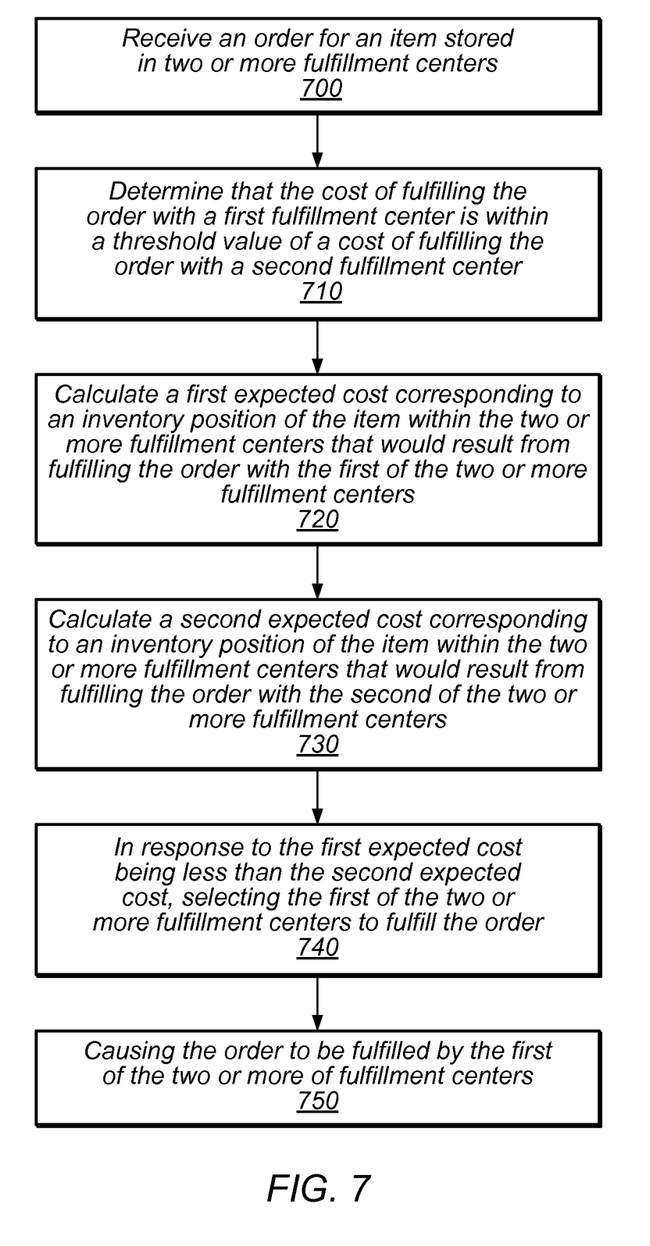
FIG. 7 is a flow diagram of a method for cost-based fulfillment tie-breaking according to some embodiments.

Referring now to FIG. 7, a flowchart of a method for cost-based fulfillment tie-breaking that may be performed by one or more computer systems according to some embodiments. At block 700, a merchant may receive an order for item that is stored in two or more fulfillment centers. At block 710, the merchant may determine that the cost of fulfilling the order with a first of the two or more fulfillment centers is within a threshold value of a cost of fulfilling the order with a second of the two or more fulfillment centers. For example, the order may specify a shipping destination and/or other options such that a difference between the two fulfillment costs fall within the threshold. At block 720, the merchant may calculate a first expected cost corresponding to an inventory position of the item within the two or more fulfillment centers that would result from fulfilling the order with the first of the two or more fulfillment centers. For sake of illustration, in the hypothetical scenario provided above, this first cost may correspond, for example, to cost(7, 3). Then, at block 730 the merchant may calculate a second expected cost corresponding to an inventory position of the item within the two or more fulfillment centers that would result from fulfilling the order with the second of the two or more fulfillment centers. Referring again to the hypothetical scenario described above, for example, the second cost may correspond to cost(8, 2).

At block 740, the merchant may select the first of the two or more fulfillment centers to fulfill the order in response to the first expected cost being smaller than the second expected cost (i.e., cost(7, 3)<cost(8, 2)). (Alternatively, the merchant may select the second fulfillment center if the second expected cost is less than the first expected cost (i.e., cost(8, 2)<cost(7, 3)).) Then, at block 750, the merchant may cause the order to be fulfilled by the first of the two or more of fulfillment centers (i.e., the fulfillment center that has the lesser cost).

In various embodiments described above, a goal-seeking, maximization, minimization, or optimization process may or may not always guarantee convergence to an absolute solution. For example, an optimization process may exhaustively evaluate a solution space to ensure that the identified solution is the best available. Alternatively, an optimization process may employ heuristic or probabilistic techniques that provide a bounded confidence interval or other measure of the quality of a solution. For example, an optimization process may be designed to produce a solution that is within at least some percentage of an optimal solution, to produce a solution that has some bounded probability of being the optimal solution, or any suitable combination of these or other techniques. Further, it is noted that as used herein, "expected cost" may but need not necessarily encompass an expected value as determined in the mathematical sense. That is, it is possible that in some embodiments, "expected cost" may be determined as a probabilistically-weighted average of possible costs. However, in other embodiments, it is contemplated that any suitable techniques may be used to predict an expected cost, including techniques such as heuristics or other decision processes that do not necessarily involve determining a probabilistic mathematical expectation.

Computer System Implementations

In some embodiments, any of the methods or techniques described above may be implemented as program instructions and data capable of being stored or conveyed via an article of manufacture including a computer-readable or -accessible medium. Such methods or techniques may include, for example and without limitation, the functions of an order fulfillment system described herein, as well as the method illustrated in FIG. 6 and any suitable variations thereof. Such program instructions may be executed to perform a particular computational function, such as cost analysis, inventory position analysis, order fulfillment management, operating system functionality, applications, and/or any other suitable functions.

Figure 8:
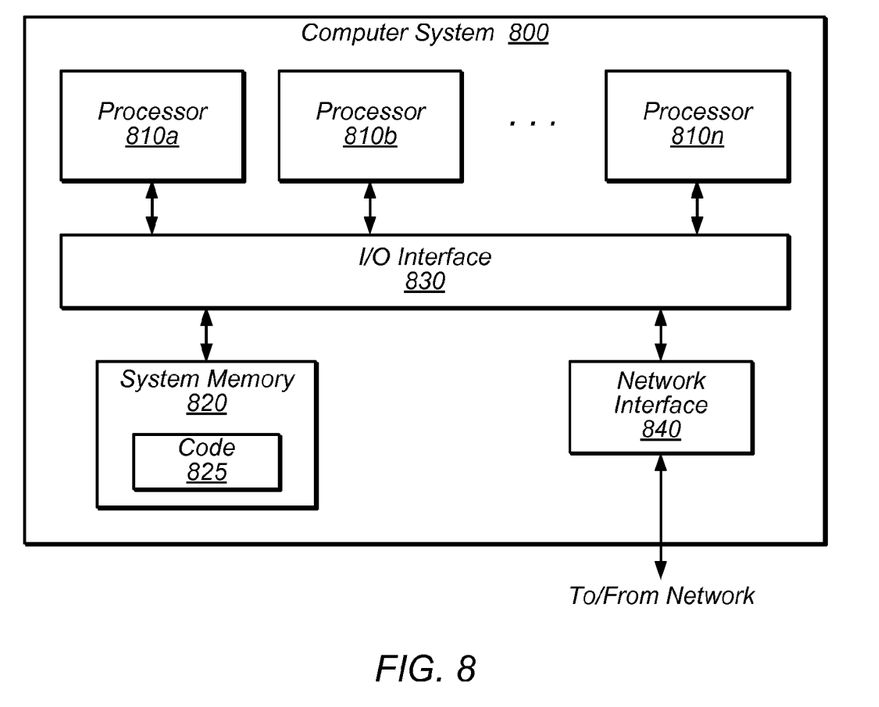
FIG. 8 is a block diagram illustrating a computer system configured to implement an order fulfillment system according to some embodiments.

An embodiment of a computer system including computer-accessible media is illustrated in FIG. 8. As illustrated, computer system 800 includes one or more processors 810 coupled to a system memory 820 via an input/output (I/O) interface 830. Computer system 800 further includes a network interface 840 coupled to I/O interface 830. In some embodiments, an order fulfillment system such as system 200 may be implemented using a single instance of computer system 800, while in other embodiments multiple such systems may be configured to host different portions or instances of system 200. For example, in one embodiment some data sources or services (e.g., planning system 220) may be implemented via instances of computer system 800 that are distinct from those instances implementing other data sources or services (e.g., order input system 210).

In various embodiments computer system 800 may be a single system including one processor 810, or a multiprocessor system including several processors 810 (e.g., two, four, eight, or another suitable number). Processors 810 may be any suitable processor capable of executing instructions. For example, in various embodiments processors 810 may be a general-purpose or embedded processor implementing any of a variety of instruction set architectures (ISAs), such as the x86, PowerPC, SPARC, or MIPS ISAs, or any other suitable ISA. In multiprocessor systems, each of processors 810 may commonly, but not necessarily, implement the same ISA.

System memory 820 may be configured to store instructions and data accessible by process 810. In various embodiments, system memory 820 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above, are shown stored within system memory 820 as code 825.

In one embodiment, I/O interface 830 may be configured to coordinate I/O traffic between processor 810, system memory 820, and any peripheral devices in the device, including network interface 840 or other peripheral interfaces. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments some or all of the functionality of I/O interface 830, such as an interface to system memory 820, may be incorporated directly into processor 810.

Network interface 840 may be configured to allow data to be exchanged between computer system 800 and other devices attached to a network, such as other computer systems, for example. In various embodiments, network interface 840 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

In some embodiments, system memory 820 may be one embodiment of a tangible computer-accessible or -readable medium configured to store program instructions and data as described above. However, in other embodiments, program instructions and/or data may be received, sent or stored upon different types of tangible computer-accessible or -readable media. Generally speaking, tangible computer-accessible or -readable media may include storage media or memory media such as magnetic or optical media, e.g., disk or CD/DVD-ROM coupled to computer system 800 via I/O interface 830. A tangible computer-accessible or -readable medium may also include any volatile or non-volatile media such as RAM (e.g., SDRAM, DDR SDRAM, RDRAM, SRAM, etc.), ROM, etc, that may be included in some embodiments of computer system 800 as system memory 820 or another type of memory. Program instructions and data stored via a tangible computer-accessible or -readable medium may be transmitted by transmission media or signals such as electrical, electromagnetic, or digital signals, which may be conveyed via a communication medium such as a network and/or a wireless link, such as may be implemented via network interface 840.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A method, comprising:
performing, by one or more computers:
determining a threshold value, wherein the threshold value is usable to determine whether a difference between a cost of fulfilling an order for an item stored in two or more fulfillment centers with a first of the two or more fulfillment centers and a cost of fulfilling the order with a second of the two or more fulfillment centers is within the threshold value, wherein a determination that the difference is within the threshold value results in a determination of a tie between the cost of fulfilling the order with the first fulfillment center and the cost of fulfilling the order with the second fulfillment center;
receiving the order for the item stored in the two or more fulfillment centers, wherein the order specifies a shipping destination;
determining that the difference between the cost of fulfilling the order with the first of the two or more fulfillment centers and the cost of fulfilling the order with the second of the two or more fulfillment centers is within the threshold value resulting in the determination of the tie between the cost of fulfilling the order with the first fulfillment center and the cost of fulfilling the order with the second fulfillment center;
in response to the determination of the tie:
determining a first expected cost corresponding to an inventory position of the item within the two or more fulfillment centers that would result from fulfilling the order with the first of the two or more fulfillment centers;
determining a second expected cost corresponding to an inventory position of the item within the two or more fulfillment centers that would result from fulfilling the order with the second of the two or more fulfillment centers;
in response to the first expected cost being less than the second expected cost, selecting the first of the two or more fulfillment centers to fulfill the order; and
in response to selecting the first of the two or more fulfillment centers, causing the order to be fulfilled by the first of the two or more of fulfillment centers.

2. The method of claim 1, wherein the threshold value is selected as zero.

3. The method of claim 1, wherein the first and second expected costs are based, at least in part, upon a probability of a future order for the item.

4. The method of claim 3, wherein the probability of the future order is determined based, at least in part, upon historical order data.

5. The method of claim 3, wherein the future order is expected to specify another shipping destination for which the first and second of the two or more fulfillment centers would have different fulfillment costs.

6. The method of claim 3, wherein the first expected cost represents a cost of being unable to fulfill the future order with the first of the two or more fulfillment centers when the future order specifies a second shipping destination such that it would be cheaper to fulfill the future order from the first of the two or more fulfillment centers than from the second of the two or more fulfillment centers, and wherein the second expected cost represents a cost of being unable to fulfill the future order with the second of the two or more fulfillment centers when the future order specifies a third shipping destination such that it would be cheaper to fulfill the future order from the second of the two or more fulfillment centers than from the first of the two or more fulfillment centers.

7. The method of claim 1, wherein determining at least one of the first and second expected costs includes retrieving the first and second expected costs from a pre-computed table.

8. The method of claim 1, wherein determining at least one of the first and second expected costs includes performing a recursive calculation in response to receiving the order.

9. The method of claim 1, further comprising:
in response to the second expected cost being less than the first expected cost, selecting the second of the two or more fulfillment centers to fulfill the order; and
subsequent to selecting the second of the two or more fulfillment centers, causing the order to be fulfilled by the second of the two or more of fulfillment centers.

10. A system, comprising:
at least one processor; and
a memory coupled to the at least one processor, wherein the memory stores program instructions, and wherein the program instructions are executable by the at least one processor to cause the system to:

determine a threshold value, wherein the threshold value is usable to determine whether a difference between costs of fulfilling an order for an item stored in a plurality of fulfillment centers with different ones of the plurality of fulfillment centers is within the threshold value, wherein a determination that the difference is within the threshold value results in a determination of a tie between the costs of fulfilling the order with the different ones of the plurality of fulfillment centers;

receive the order for the item stored in the plurality of fulfillment centers, wherein the received order specifies a delivery parameter;

determine that the difference between fulfillment costs of the different ones of the plurality of fulfillment centers is within the threshold value resulting in the determination of the tie between the fulfillment costs of the different ones of the plurality of fulfillment centers;

in response to the determination of the tie, determine expected costs of fulfilling a future order for the item corresponding to inventory positions that would result from fulfilling the order by different ones of the plurality of fulfillment centers; and select a given one of the plurality of fulfillment centers to fulfill the received order based, at least in part, upon the expected costs.

11. The system of claim 10, wherein the delivery parameter includes a delivery address, a delivery method, or a combination of delivery address with delivery method.

12. The system of claim 10, wherein the threshold value is greater than zero.

13. The system of claim 10, wherein the expected costs are based, at least in part, upon a probability of the future order, and wherein the future order is determined based, at least in part, upon historical ordering data.

14. The system of claim 10, wherein the future order is expected to specify another delivery parameter for which the difference between the fulfillment costs of the different ones of the plurality of fulfillment centers is greater than the threshold value.

15. The system of claim 10, wherein to determine the expected costs, the program instructions are further executable by the at least one processor to retrieve the expected costs from a look-up table.

16. A non-transitory computer-readable storage medium having program instructions stored thereon that, upon execution by a computer system, cause the computer system to:

determine a threshold value, wherein the threshold value is usable to determine whether a difference between costs of fulfilling an order for an item stored in a plurality of fulfillment centers with one of the plurality of fulfillment centers and a cost of fulfilling the order with another one of the plurality of fulfillment centers is within the threshold value, wherein a determination that the difference is within the threshold value results in a determination of a tie between the cost of fulfilling the order with the one fulfillment center and the cost of fulfilling the order with the other one fulfillment center;

receive an indication of the order for the item stocked in the plurality of fulfillment centers;

determine that the difference between the cost of fulfilling the order with the one fulfillment center and the cost of fulfilling the order with the other one fulfillment center is within the threshold value resulting in the determination of the tie between the cost of fulfilling the order with the one fulfillment center and the cost of fulfilling the order with the other one fulfillment center;

in response to the determination of the tie, determine expected costs corresponding to inventory positions that would result from fulfilling the order with the one and other one fulfillment centers; and select a given one of the plurality of fulfillment centers to fulfill the order based, at least in part, upon the expected costs.

17. The non-transitory computer-readable storage medium of claim 16, wherein the order specifies a delivery address such that the difference between the cost of fulfilling the order from the one of the plurality of fulfillment centers and the cost of fulfilling the order from the other one of the plurality of fulfillment centers is within the threshold value.

18. The non-transitory computer-readable storage medium of claim 17, wherein the expected costs are based, at least in part, upon a probability of receiving a future order that specifies another delivery address such that the difference between a cost of fulfilling the future order from the one of the plurality of fulfillment centers and a cost of fulfilling the future order from the other one of the plurality of fulfillment centers would be larger than the threshold value.

19. The non-transitory computer-readable storage medium of claim 16, wherein the order specifies a combination of delivery address and shipping method such that the difference between the cost of fulfilling the order from the one of the plurality of fulfillment centers and the cost of fulfilling the order from the other one of the plurality of fulfillment centers is within the threshold value.

20. The non-transitory computer-readable storage medium of claim 19, wherein the expected costs are based, at least in part, upon a probability of receiving a future order that specifies another combination of delivery address and shipping method such that the difference between a cost of fulfilling the future order from the one of the plurality of fulfillment centers and a cost of fulfilling the future order from the other one of the plurality of fulfillment centers would be larger than the threshold value.

* * * * *